E. H. KOKEN.
VEHICLE WHEEL RIM.
APPLICATION FILED MAY 18, 1911.

1,009,529.

Patented Nov. 21, 1911.

Witnesses:
A. E. McClintock
A. E. King

Inventor,
Edward H. Koken,
by C. E. Humphrey
Atty.

UNITED STATES PATENT OFFICE.

EDWARD H. KOKEN, OF AKRON, OHIO.

VEHICLE-WHEEL RIM.

1,009,509.

Specification of Letters Patent. Patented Nov. 21, 1911.

Application filed May 18, 1911. Serial No. 628,087.

*To all whom it may concern:*

Be it known that I, EDWARD H. KOKEN, a citizen of the United States, residing at Akron, in the county of Summit and State of Ohio, have invented new and useful Improvements in Vehicle-Wheel Rims, of which the following is a specification.

This invention relates to improvements in vehicle wheel rims of the type adapted to hold an elastic or cushion tire, and the object of the invention is, broadly speaking, to provide a rim which will securely hold an elastic tire in its proper seat on the rim and simultaneously contract or place a tension upon the base portion of the tire with a view of increasing the longevity of the tire and its general effectiveness. The contracting or compressing of the base also serving to prevent the unintentional displacement of the tire and the danger of its being torn from its position on the rim.

The invention contemplates providing the felly with a rim constituting a seat for a tire, the inner lateral faces of which are beveled. Coöperating with which are a pair of annular contractible tire-holding bands with their outer portions shaped to engage the base of the tire and with their inner portions adapted to engage the beveled side edges of the felly rim in such a manner that as the tire retaining bands are drawn inwardly transversely toward the tire the bands will contract and simultaneously engage the side edges of the base of the tire to contract the latter and grip the same more securely. In order to move the tire-retaining bands transversely toward each other there is provided a pair of rings adapted to be held in position by means of bolts extending through them and the body of the felly to draw them inwardly toward the side faces of the latter for forcing the tire-holding bands inwardly against the felly-rim and the tire-body. The effect of which is to compress the base of the tire to render the latter more compact and firmer, thereby eliminating the danger of creeping and stiffening and strengthening the tire structure.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

Figure 1:
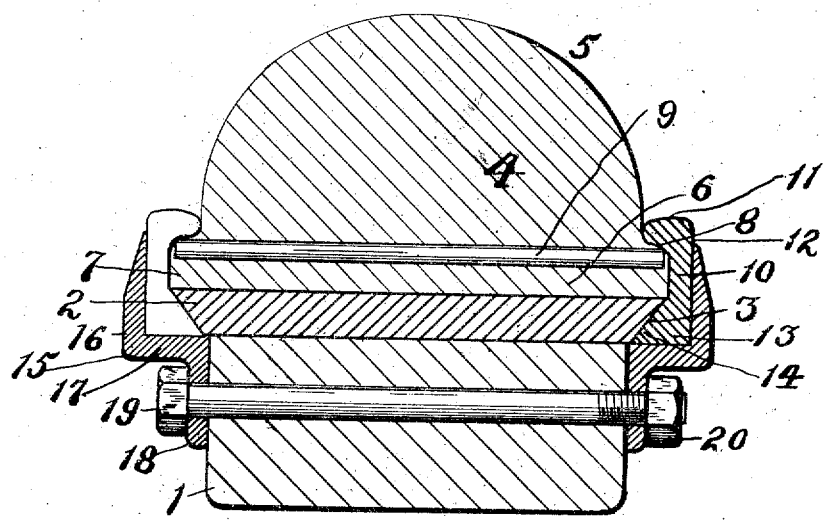
Figure 2:
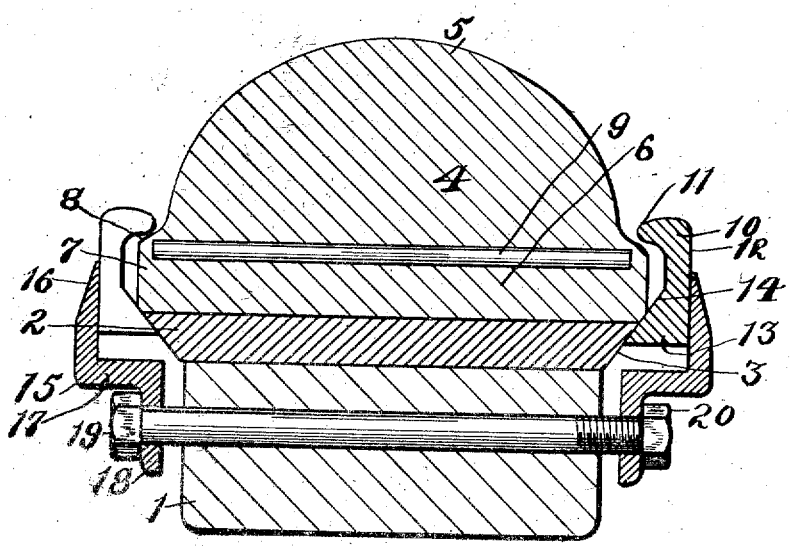

In the drawings in which similar reference numerals indicate like parts in the different figures, Figure 1, is a view in transverse section of the rim portion of a vehicle wheel with a conventional type of tire mounted thereon, the tire holding means being shown in the position which they assume when set up; and, Fig. 2, is a similar view with the parts in the position which they will assume when the wheel is being assembled.

Referring to the drawings in detail the reference numeral 1 denotes the felly, mounted on which is a felly-rim 2 with the side faces 3 thereof beveled or inclined and projecting laterally slightly over the side faces of the felly 1. This rim is preferably endless and is shrunk or otherwise secured on the felly 1 in such a manner as to prevent its independent movement.

Mounted on the rim 1 is an elastic tire 4 comprising a tread 5 and a base 6, the latter provided with laterally projecting annular ribs 7 which are united with the tread of the tire in such a manner as to form shoulders or seats 8. This tire may have any tread formation and may be continuous, annular, or may be made up of a plurality of independent blocks. There is also preferably placed within the base portion of the tire a plurality of transversely-extending rods 9 extending into the lateral ribs 7 but preferably terminating short of the side edges thereof. The transverse diameter of the base portion of the tire will preferably, under ordinary circumstances, be wider than the outer face of the felly-rim 2.

The tire 4 is preferably held in position on the felly-rim 2 by means of a pair of contractible tire-retaining bands, each consisting of a split-ring 10, each of which embodies an outer portion 11 which is hook-shaped to engage one shoulder 8 of the tire. The lateral outer-face 12 of each of the bands is preferably flat and the inner portion 13 is wedge-shaped with the opposite lateral face 14 inclined to engage the inclined face 3 on one side of the felly-rim 2 and is complemental thereto. Between the inclined face 14 and the hook-shaped portion 11 of these bands are contracted neck-portions. These contractible tire-retaining bands 10 are adapted to be positioned on opposite sides of the tire with the hook portions 11 disposed opposite to the shoulders 8 of the tire and with the inclined faces 14 thereof arranged in engaging relation with the lateraly inclined faces 3 of the felly-rim 2.

The tire-retaining bands 10 are moved toward each other and into engagement with the lateral faces of the tire by the following mechanism. Mounted on the sides of the felly are a pair of clamping rings 15 each of which embodies an outwardly-projecting flange 16 adapted to bear against the outer face of one of the tire-retaining rings 10, from which extends laterally toward the felly a horizontal portion 17 the outer face of which constitutes a seat for one of the members 10 when the parts are assembled. Extending inwardly from the portion 17 is a flange 18 which is adapted to abut against one of the side faces of the felly, and these clamping rings are provided with alined apertures to receive bolts 19 which also extend through the felly and bear nuts 20 by which the clamping rings are drawn toward each other to bring the flanges 18 snugly against the felly when the tire is set up.

It will be noted from the foregoing construction that as the bolts 19 are tightened up the outwardly-projecting flanges 16 engage the outer lateral faces of the contractible tire-retaining bands 10 forcing them inwardly toward each other and as their inclined faces 14 engage the inclined lateral faces 3 of the felly-rim it will cause them to contract circumferentially as they move toward each other, in doing which the hook-portion 11 of the tire-retaining bands engage the shoulders 8 of the tire forcing the base portion of the tire inwardly under considerable tension and simultaneously compressing the same laterally until a tire which has approximately the natural configuration shown in Fig. 2 will be distorted into the shape shown in Fig. 1. This distortion of the base portion of the tire tends to compact or compress it, making the same denser and accomplishing the object sought by this invention.

It will be particularly noted that as the tire-retaining bands 10 are split rings with laterally-inclined faces which engage laterally-inclined faces of the felly-rim, any inward transverse movement given to them toward each other will naturally cause a contraction thereof by means of the wedging action set up by the contact of their inclined portions with the inclined faces of the felly rim; and as the compacting or compression of the base portion of an elastic vehicle tire is accompanied by exceedingly favorable results in the use of this type of tire, the object sought is easily effected by the means hereinbefore described.

I claim:

1. A vehicle wheel embodying a circumferential rim having the lateral faces thereof inwardly beveled, the outer face of said rim constituting a tire seat, a pair of tire-retaining bands comprising split rings positioned on opposite sides of said rim, the outer portions of said bands formed to engage the base portion of a tire and their inner lateral portions beveled to engage the beveled side faces of said rim whereby when said bands are forced transversely toward each other the beveled portions of said bands and rim will engage causing thereby a contraction of the former, and a pair of annular clamping bands arranged to engage the outer lateral faces of said retaining bands for drawing the latter toward each other and simultaneously contracting the same on said tire.

2. A vehicle wheel embodying a tire-seating circumferential rim having the lateral faces thereof inwardly beveled, a pair of tire-retaining bands comprising broken rings positioned on opposite sides of said rim, the outer portions of said bands suitably formed to engage the base portion of a tire and with their inner lateral portions beveled to engage the beveled side faces of said rim whereby when said bands are shifted transversely toward said tire the beveled portions of said bands and rim will engage causing thereby a contraction of the former and a simultaneous compression of the base portion of the tire and means independent of said bands and rim for laterally shifting the former.

3. A vehicle wheel embodying a tire-seating circumferential rim, a pair of tire-retaining bands comprising broken rings positioned on opposite sides of said rim, the outer portions of said bands formed to engage the base portions of a tire and their inner lateral portions arranged to engage the beveled side faces of said rim whereby when said bands are shifted transversely toward each other the engagement between the engaging portions of said bands and rim will cause a contraction of the former, a pair of annular clamping bands arranged to engage the outer lateral faces of said retaining bands, and means for drawing said clamping bands toward each other for laterally shifting said retaining bands to contract the latter.

4. A vehicle wheel embodying a felly, a tire-seating circumferential rim mounted on said felly and having the lateral faces thereof inwardly beveled, a pair of tire-retaining bands comprising broken rings positioned on opposite sides of said rim, the outer portions of said bands suitably formed to engage the base portion of a tire and their inner lateral portions suitably formed to coöperate with the beveled portions of said rim to cause a contraction of the former and compression of the base portion of a tire, a pair of annular clamping bands arranged to engage the outer lateral faces of said retaining bands and adapted to draw the latter toward the said tire and simultaneously contract the latter, and a plurality of bolts extending through said clamping bands and said felly for drawing the former toward each other.

In testimony whereof I have hereunto set my hand in presence of two subscribing witnesses

EDWARD H. KOKEN.

Witnesses:
C. E. HUMPHREY,
A. L. McCLINTOCK.